United States Patent
Amitay et al.

(10) Patent No.: US 10,907,669 B2
(45) Date of Patent: Feb. 2, 2021

(54) METHODS AND APPARATUS FOR CONTROLLING FLOW FIELDS

(71) Applicant: RENSSELAER POLYTECHNIC INSTITUTE, Troy, NY (US)

(72) Inventors: Michael Amitay, Loudonville, NY (US); Samantha Gildersleeve, Germantown, NY (US)

(73) Assignee: Rensselaer Polytechnic Institute, Troy, NY (US)

(*) Notice: Subject to any disclaimer, the term of this patent is extended or adjusted under 35 U.S.C. 154(b) by 0 days.

(21) Appl. No.: 16/676,003

(22) Filed: Nov. 6, 2019

(65) Prior Publication Data
US 2020/0072259 A1 Mar. 5, 2020

Related U.S. Application Data

(63) Continuation of application No. 16/096,503, filed as application No. PCT/US2017/029236 on Apr. 25, 2017, now Pat. No. 10,502,246.
(Continued)

(51) Int. Cl.
*B64C 21/04* (2006.01)
*F15D 1/12* (2006.01)
*B64C 21/08* (2006.01)

(52) U.S. Cl.
CPC ............ *F15D 1/12* (2013.01); *B64C 21/04* (2013.01); *B64C 21/08* (2013.01);
(Continued)

(58) Field of Classification Search
CPC .......... F15D 1/12; B64C 21/04; B64C 21/08; B64C 2230/04; B64C 2230/06; B64C 2230/18; Y02T 50/10; Y02T 50/166
(Continued)

(56) References Cited

U.S. PATENT DOCUMENTS 3,604,661 A * 9/1971 Mayer, Jr. ............... B64C 21/04
 244/207
3,752,172 A ‡ 8/1973 Cohen ...................... F16C 1/00
 137/12
(Continued)

OTHER PUBLICATIONS

International Search Report and the Written Opinion of the International Searching Authority, International Application No. PCT/US2017/029236, dated Jul. 26, 2017.‡

*Primary Examiner* — Minh Q Le
(74) *Attorney, Agent, or Firm* — Murtha Cullina LLP; Anthony P. Gangemi

(57) ABSTRACT

Methods and systems for controlling a fluid flow field near a surface are disclosed. In some embodiments, the system includes an array of oscillating bodies disposed on the surface to provide physical modification to the flow field. Fluid jets are also emitted from an outlet in the oscillating body to provide virtual modification of the flow field through momentum addition. Fluid jet sources, including synthetic jet generators such as piezoelectric drivers and sources of compressed fluids such as air or water, are positioned to be in fluid communication with the outlet at intervals during the oscillation of the oscillating body. Controlling the oscillation amplitude and frequency of the body, as well as the location of oscillating body outlets and frequency of fluid jet emission, have advantageous effects for the surface such as improved heat transfer properties and reduction in structural vibration and noise.

20 Claims, 6 Drawing Sheets

Related U.S. Application Data

(60) Provisional application No. 62/489,030, filed on Apr. 24, 2017, provisional application No. 62/326,850, filed on Apr. 25, 2016.

(52) U.S. Cl.
CPC ...... *B64C 2230/04* (2013.01); *B64C 2230/06* (2013.01); *B64C 2230/18* (2013.01); *Y02T 50/10* (2013.01)

(58) Field of Classification Search
USPC ..... 137/803, 829, 831; 244/205, 199.1, 201, 244/203, 204
See application file for complete search history.

(56) References Cited

U.S. PATENT DOCUMENTS

| | | | | |
|---|---|---|---|---|
| 4,693,201 A * | 9/1987 | Williams | ............... | B62D 35/00 114/67 R |
| 4,786,836 A * | 11/1988 | Tokushima | ............ | G11B 15/18 310/12.27 |
| 4,802,642 A ‡ | 2/1989 | Mangiarotty | ........... | B64C 23/00 244/130 |
| 5,803,409 A * | 9/1998 | Keefe | .................. | B64C 23/005 244/206 |
| 5,938,404 A * | 8/1999 | Domzalski | .............. | B64C 23/04 416/91 |
| 6,109,565 A * | 8/2000 | King, Sr. | ................ | B64C 21/04 244/207 |
| 6,471,477 B2 ‡ | 10/2002 | Hassan | .................. | B64C 23/04 244/130 |
| 6,793,177 B2 ‡ | 9/2004 | Bonutti | .................. | B60C 19/00 244/130 |
| 6,899,302 B1 ‡ | 5/2005 | Hassan | ................ | B64C 21/025 244/13 |
| 7,070,144 B1 ‡ | 7/2006 | DiCocco | .................. | B64C 5/12 244/3.21 |
| 7,104,143 B1 * | 9/2006 | Powell | .................. | B64C 21/025 73/861.74 |
| 7,128,082 B1 * | 10/2006 | Cerretelli | .................. | B05B 1/08 137/14 |
| 7,246,529 B1 * | 7/2007 | Powell | .................. | B64C 21/025 73/861 |
| 7,510,149 B2 * | 3/2009 | Miller | ..................... | B64C 21/02 244/207 |
| 8,033,324 B2 ‡ | 10/2011 | Mukasa | ..................... | F04F 7/00 165/121 |
| 8,047,783 B2 * | 11/2011 | Nies | ........................ | F03D 7/022 416/1 |
| 8,382,043 B1 * | 2/2013 | Raghu | ..................... | B64C 21/04 244/207 |
| 9,027,702 B2 ‡ | 5/2015 | Griffin | ..................... | F01N 1/02 181/206 |
| 9,371,131 B2 * | 6/2016 | Bauer | ..................... | F03D 7/022 |
| 10,054,048 B2 ‡ | 8/2018 | Baruzzini | .................. | F02C 7/04 |
| 2006/0172633 A1 * | 8/2006 | Gusler | ..................... | B63H 1/30 440/113 |
| 2006/0219847 A1 * | 10/2006 | Miller | ..................... | B64C 21/04 244/204.1 |
| 2006/0273197 A1 * | 12/2006 | Saddoughi | ................ | F15D 1/12 239/265.17 |
| 2008/0149205 A1 * | 6/2008 | Gupta | ..................... | F01D 5/145 137/829 |
| 2009/0308980 A1 * | 12/2009 | Miller | ..................... | B64C 21/04 244/207 |
| 2010/0071773 A1 ‡ | 3/2010 | Whalen | ................. | B64C 21/025 137/2 |
| 2014/0116138 A1 ‡ | 5/2014 | Sheverev | ............. | G01N 17/008 73/579 |
| 2015/0239552 A1 * | 8/2015 | Nikic | ..................... | B64C 21/04 244/207 |
| 2016/0280358 A1 * | 9/2016 | Lin | ..................... | B64C 21/08 |
| 2017/0088254 A1 * | 3/2017 | Hong | ..................... | B64C 15/14 |
| 2017/0297680 A1 * | 10/2017 | Shmilovich | ............ | F15B 21/12 |
| 2018/0105258 A1 ‡ | 4/2018 | Paredes Gonzalez | .. | B64C 21/08 |
| 2018/0162521 A1 * | 6/2018 | Langenbacher | ........ | F15D 1/008 |
| 2018/0281930 A1 * | 10/2018 | Koklu | ..................... | B64C 21/08 |

\* cited by examiner
‡ imported from a related application

METHODS AND APPARATUS FOR CONTROLLING FLOW FIELDS

CROSS REFERENCE TO RELATED APPLICATION(S)

This application is a continuation of U.S. Non-Provisional patent application Ser. No. 16/096,503, filed Oct. 25, 2018, which is a national stage filing of International Patent Application No. PCT/US2017/029236, filed Apr. 25, 2017, which claims the benefit of U.S. Provisional Application Nos. 62/326,850, filed Apr. 25, 2016, and 62/489,030, filed Apr. 24, 2017, which are incorporated by reference as if disclosed herein in their entirety.

BACKGROUND

Flow control is of growing interest in present day fluid mechanics, aerodynamics research, and industry. Improved performance of aerodynamic surfaces is at least in part achieved by either preventing or mitigating separation of the flow field on that surface. Improved flow characteristics over an aerodynamic surface can have profound effects, such as greatly enhancing its aerodynamic performance, increasing the operational lifespan of the surface, increasing heat transfer efficiency, improving overall user experience, and decreasing maintenance costs.

Active and passive flow modification devices have been shown to enhance performance of various systems, such as: flow over wings, electronic cooling, reduction of structural vibrations, noise mitigation, etc. However, previous devices have shown limited ability to finely control these modifications and thus control over flow fields themselves, and further, particularly for passive modification devices, cannot be removed when ineffective or not needed, and thus result in a penalty to the system.

SUMMARY

Some embodiments of the disclosed subject matter are directed to an actuator assembly system that applies physical and virtual modification to surfaces found in flow/heat transfer systems. In some embodiments, the system of the present disclosure incorporates dynamic shape changes of a body, dynamic oscillatory motion of the body, and/or periodic addition of momentum and/or vorticity by a fluid jet emitted from the body. In some embodiments, the oscillating bodies extend through the surface and are motivated by an oscillator and actuator housed beneath the surface. The bodies include one or more outlets from which fluid jets are emitted from a fluid jet source, such as a compressed fluid source or a synthetic jet generator. The outlets are configured to emit fluid jets at desired internals during oscillation of the bodies.

The placement of low aspect ratio bodies, such as those consistent with the present disclosure, on a surface within (or slightly above) a boundary layer affects the fluid flow over that surface. Therefore, each of the flow field modifiers, the physical modifiers (bodies) and virtual modifiers (fluid jets), which work to manipulate the flow field, such as by introducing, lessening, reshaping, or moving disturbances in the flow field, can be tuned to affect the performance of the apparatus of which the surface is a part.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1A:
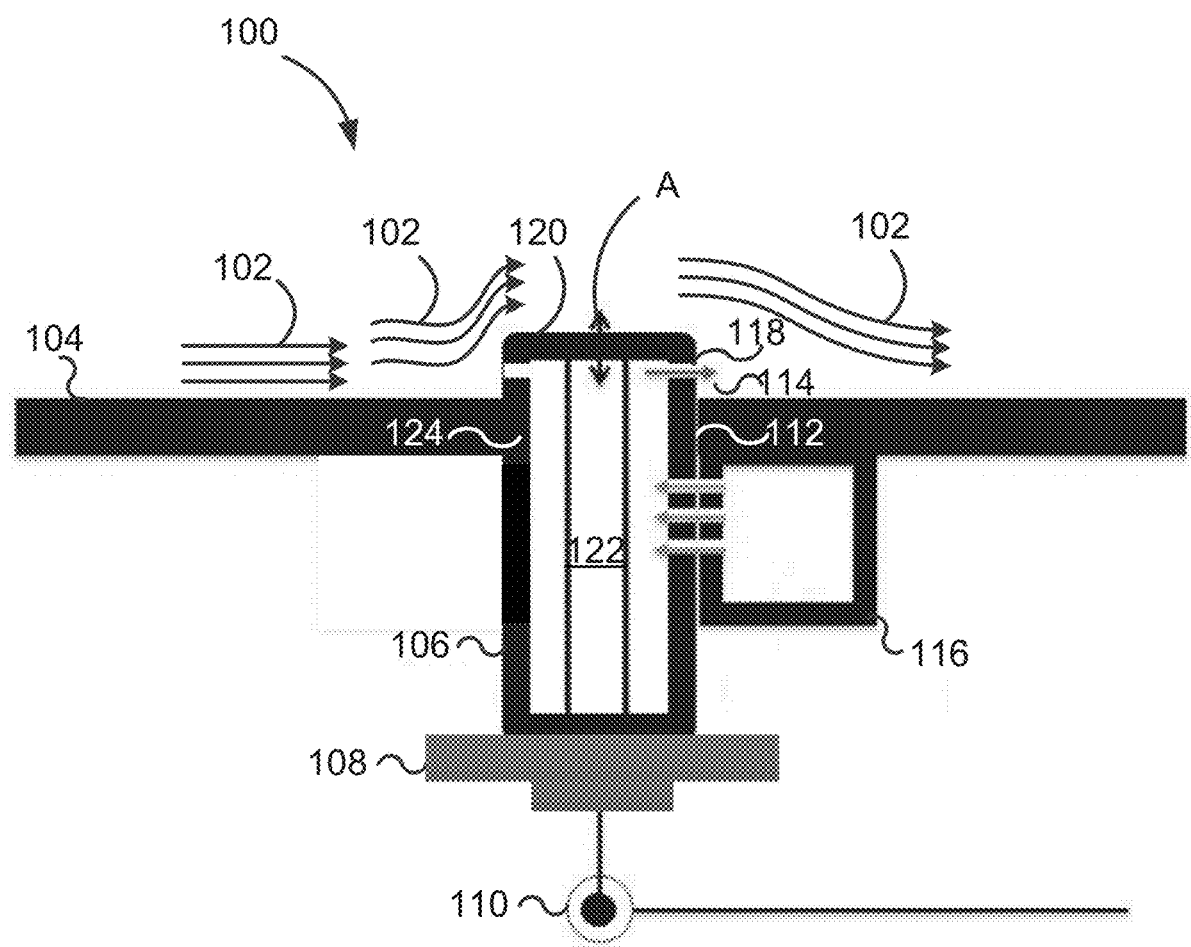
FIG. 1A is a schematic drawing of a flow field controlling actuator assembly system according to some embodiments of the present disclosure.

Referring now to FIG. 1A, aspects of the disclosed subject matter include an actuator assembly 100 for controlling a flow field 102 over a surface 104. In some embodiments, actuator assembly includes a body 106 and an oscillator 108 motivated by a power source 110, such as a motor. In some embodiments, actuator assembly 100 is installed in a surface 104 through an opening 112.

In some embodiments, assembly 100 produces a fluid jet 114 that is emitted from body 106 to flow field 102. In some embodiments, fluid jet 114 is produced by a fluid jet source 116. When fluid jet source 116 is in fluid communication with an outlet 118 in body 106, fluid jet 114 is emitted from the body. Surface 104 is any surface around which fluid flows, although the exemplary embodiments described herein will mainly relate to the surfaces of air, ground, and sea vehicles.

Oscillator 108 is positioned to oscillate body 106 relative to a reference point, such as surface 104. Any suitable configuration of oscillator 108 and power source 110 can be employed as long as the appropriate motive, oscillatory force is applied to body 106 to oscillate the body along a desired path, such as along a path A. For example, in some embodiments, power source 110 provides rotational motion to a crank (not shown), the rotational motion then translated to linear motion of oscillator 108 via a slide crank mechanism. In some embodiments, power source 110 drives a series of gears (not shown) to provide rotational motion. In some embodiments, vertical and rotational motion are both imparted to body 106 during oscillation. In some embodiments, threading, ball bearings, and circumferential rail systems are positioned on at least one of body 106, oscillator 108, and power source 110 to facilitate the vertical and rotational motion. In some embodiments, body 106, oscillator 108, and power source 110 are positioned to provide horizontal motion relative a reference point.

In some embodiments, body 106 is cylindrical, prismatic, or a combination thereof. Body 106 is of any suitable cross-sectional shape, so long as it is capable of providing desired physical and virtual modifications to flow field 102. In some embodiments, body 106 is an elongate, unitary construction shaped to extend beyond opening 112 and at least partially through surface 104. In some embodiments, body 106 is shaped to span an entire thickness of surface 104. In some embodiments, body 106 has an end 120. In some embodiments, flat, convex, concave, or angled conformation, or a combination thereof.

Figure 1B:
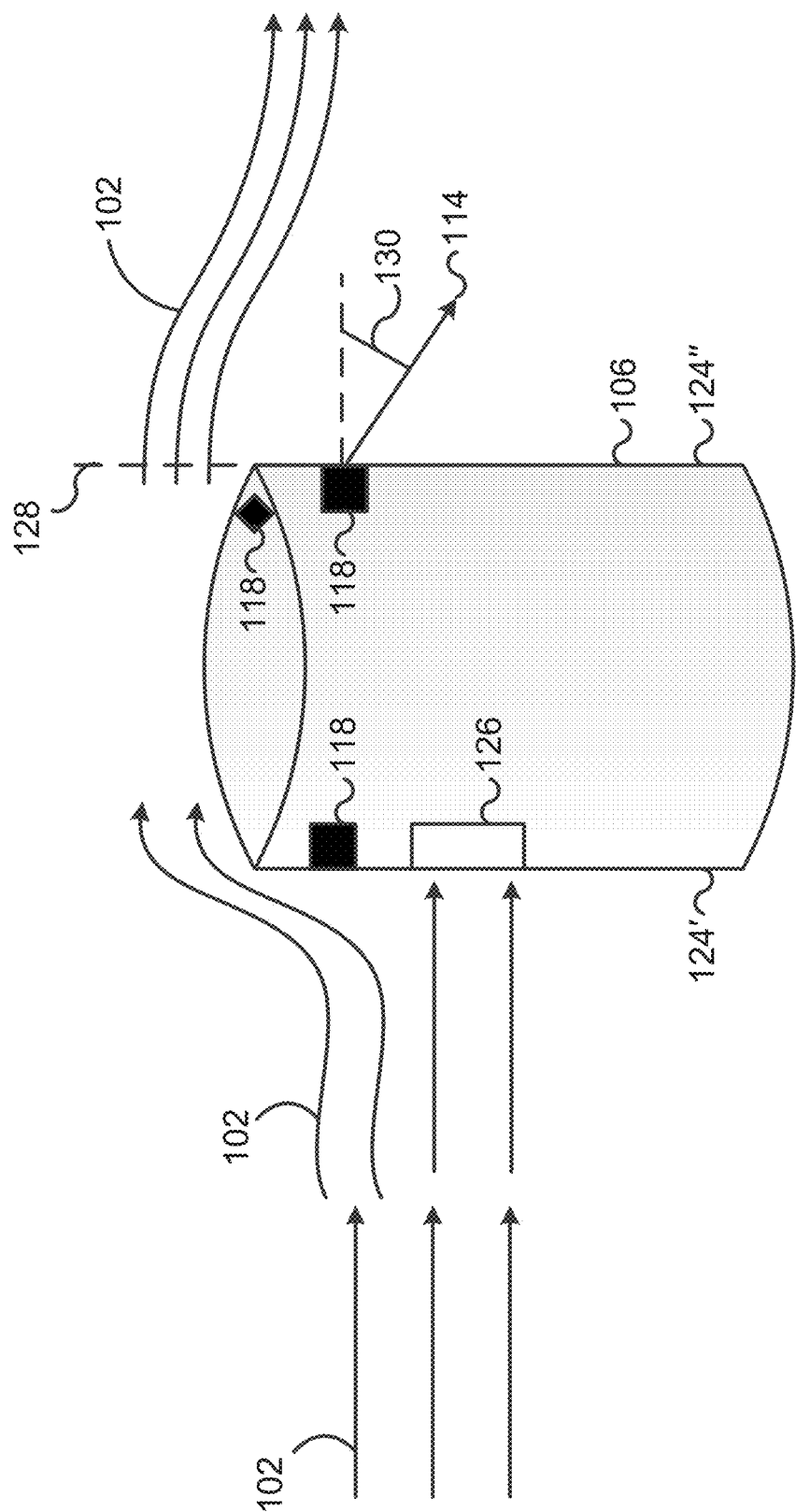
FIG. 1B is a schematic drawing of a body of a flow field controlling actuator assembly system according to some embodiments of the present disclosure.

Still referring to FIG. 1A, body 106 includes an outlet 118 providing fluid communication between an interior or an interior cavity 122 of the body and an exterior of the body, such as flow field 102. In some embodiments, a plurality of outlets 118 are provided on body 106 at wall 124. In some embodiments, a plurality of interior cavities 122 and outlets 118 are contemplated. Referring now to FIG. 1B, a body 106 in a flow field 102 will generally produce a stagnation point 126 on an upstream portion 124' of wall 124 of the body, as well as separation points 128 where the boundary layer flow field detaches from the body. In some embodiments, an outlet 118 is positioned at or adjacent to stagnation point 126. In some embodiments, an outlet 118 is positioned at or upstream from a separation point 128. In some embodiments, an outlet 118 is positioned at or downstream from separation point 128. In some embodiments, an outlet 118 is positioned adjacent separation point 128. In some embodiments, an outlet 118 is positioned on a downstream portion 124" of wall 124 of body 106. In some embodiments, outlet 118 is positioned at a particular height on wall 124, where the particular height is at least less than about 95 percent of a total height of the wall as measured from surface 104. In some embodiments, an outlet 118 is positioned adjacent end 120.

Outlet 118 is shaped to emit fluid jet 114 to flow field 102 at a predetermined flow path and predetermined flow velocity. Outlet 118 is any suitable shape, such as circular, rectangular, and the like. In some embodiments, outlet 118 is circular to help mitigate potential edge effects associated with other outlet shapes such as rectangular outlets. In some embodiments, outlet 118 is positioned to direct fluid jet 114 at an oblique angle 130 relative to flow field 102 or surface 104. In some embodiments, angle 130 is between about 0 degrees to about 45 degrees relative to flow field 102 or surface 104.

In some embodiments, fluid jet source 116 is a compressed fluid, a synthetic jet generator, an external flow stream, or a combination thereof. In embodiments, where fluid jet source 116 is a synthetic jet generator, it is a piezoelectric driver, movement of the oscillating body itself, an electromagnetic driver, a mechanically vibrated membrane, or a combination thereof.

As discussed above, body 106 is motivated by oscillator 108 and power source 110 to oscillate at least one of vertically, horizontally, and rotationally to oscillate relative to a reference point, such as surface 104 at a predetermined frequency. Therefore, in some embodiments, outlet 118 also oscillates at least one of vertically, horizontally, and rotationally as oscillator 108 and power source 110 oscillate body 106. In some embodiments, body 106 oscillates is configured to oscillate at a frequency of about 0 kHz to about 20 kHz. In some embodiments, body 106 oscillates the shedding frequency associated with flow around body 106; the shear layer frequency associated with flow separation from the top of body 106, the frequency associated with the incoming boundary layer, or the shedding frequency from surface 104. In some embodiments, a velocity sensor, dynamic pressure transducer, microphone, or combinations thereof are positioned in the flow field to help determine the frequency at which body 106 should oscillate.

In some embodiments, outlet 116 is positioned to direct fluid jet 114 at predetermined intervals during body oscillation. In some embodiments, the predetermined intervals are engineered to occur when fluid jet source 116 is in fluid communication with outlet 118, thus allowing fluid from the fluid jet source to "escape" through the outlet to the area surrounding body 106.

Figure 2:
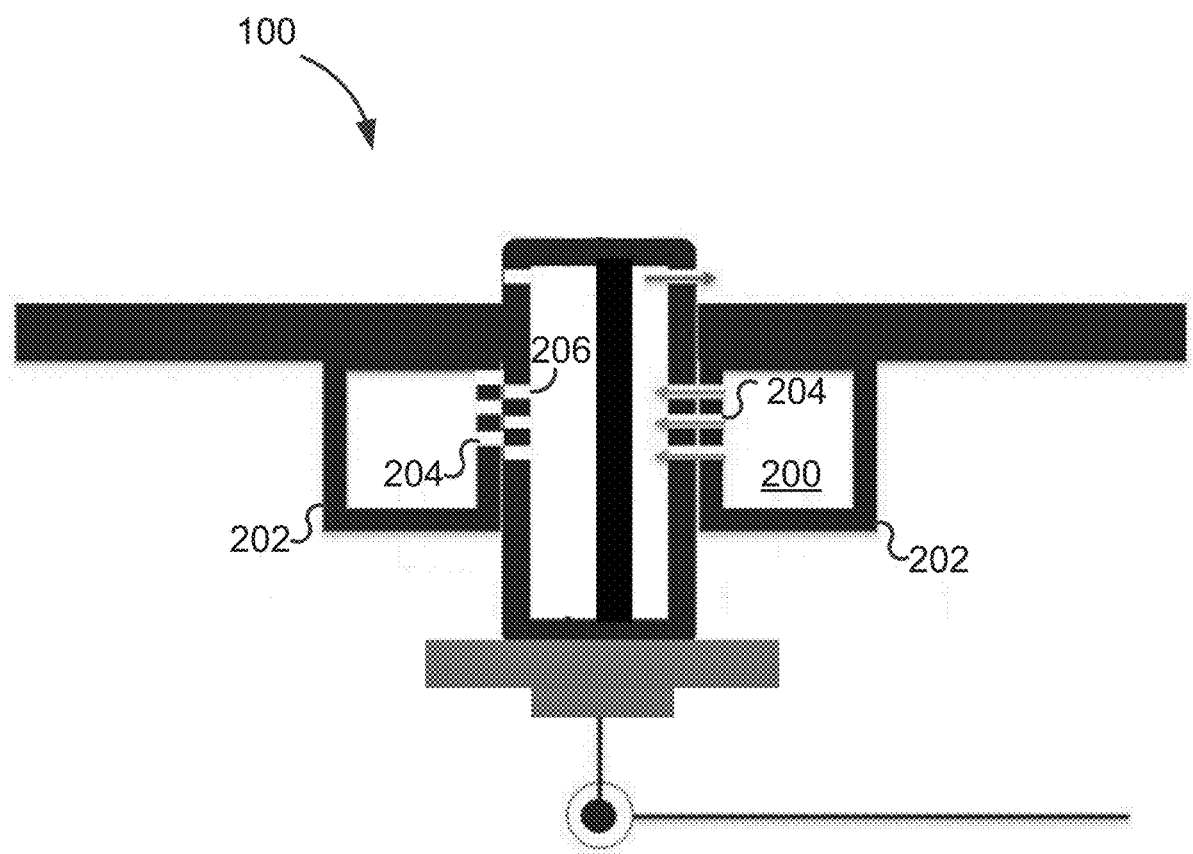
FIG. 2 is a schematic drawing of a further embodiment of a flow field controlling actuator assembly system according to some embodiments of the present disclosure.

Referring now to FIG. 2, in some embodiments, fluid jet source 116 is a compressed fluid 200. Compressed fluid is contained in a compartment 202. Compartment 202 includes a fluid jet source opening 204 to allow fluid communication between the compartment and outlet 118. In some embodiments, wall 124 in body 106 includes a wall opening 206. As depicted pictographically in FIG. 2, in these embodiments, when fluid jet source opening 204 and wall opening 206 are not aligned, compressed fluid 200 is retained in compartment 202. However, as when fluid jet source opening 204 and wall opening 206 are brought into alignment, compressed fluid 200 is allowed to flow from compartment 202 to outlet 118. When body 106 oscillates, therefore, fluid jet source opening 204 and wall opening 206 will be periodically brought into alignment, resulting in periodic emission of fluid jets 114 from outlet 118.

In some embodiments, actuator assembly 100 includes a plurality of compartments 202. In some embodiments, body 106 includes a plurality of wall openings 206. In some embodiments, plurality of wall opening 206 are in fluid communication with interior cavity 122 at intervals during oscillation of body 106. In some embodiments, body 106 includes a plurality of interior cavities 122. In some embodiments, each of plurality of compartments 202 have fluid jet source openings 204 positioned to periodically align with different ones of plurality of wall openings 206, which are in turn in fluid communication with different ones of outlets 118. In some of these embodiments, each of plurality of wall openings 206 are positioned to provide fluid communication between compartments 202 and corresponding outlets 118 at the same time, so that multiple fluid jets 114 are emitted from multiple outlets substantially simultaneously. In some of these embodiments, each of plurality of wall openings 206 is positioned to provide fluid communication between compartments 202 and corresponding outlets 118 at intervals, so that multiple fluid jets 114 are emitted from multiple outlets at different times.

In some embodiments, fluid jet 114 from fluid jet source 116 dynamically modifies body 106 at predetermined intervals. In some embodiments, an elastic material is positioned over outlet 118 and fluid jet 114 dynamically modifies the elastic material. In some embodiments, a portion of body 106, such as end 120 or wall 124, are dynamically modified. In some embodiments, only a segment of a portion of body 106 is dynamically modified, such as a perimeter of end 120. In some embodiments, the dynamic modifications include inflation, deflation, expansion, contraction, translation, bulging, caving, etc.

Figure 3:
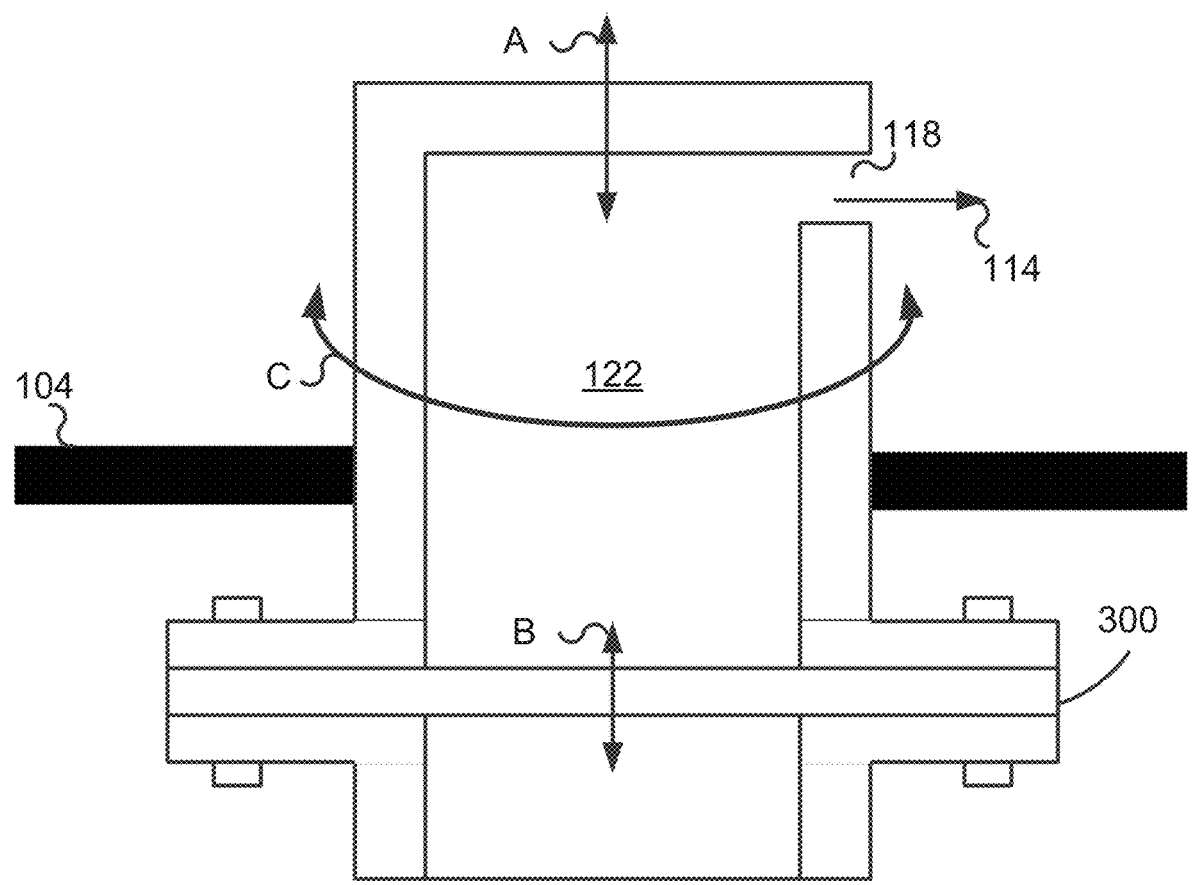
FIG. 3 is a schematic drawing of a further embodiment of a flow field controlling actuator assembly system according to some embodiments of the present disclosure.

Referring now to FIG. 3, as discussed above regarding some embodiments, fluid jet source 116 is a synthetic jet generator 300, e.g., a piezoelectric driver. In some embodiments, synthetic jet generator 300 is located in interior cavity 122. Vibrations B result in the emission of fluid jet 114 from outlet 118 using the fluid that is inhaled and expelled periodically through opening 118 in interior cavity 122. In some embodiments, synthetic jet generator 300 oscillates with body 106 at either the same frequency or an independent frequency. In some embodiments, Vibrations B are driven with other waveforms such as pulsed modulation or amplitude modulation. In some embodiments, synthetic jet generator 300 remains substantially stationary while body 106 oscillates. In some embodiments, body 106 oscillates axially (along path A) and/or rotationally (along path C).

In some embodiments (not pictured), a plurality of bodies 106 are provided in an array. In some embodiments, each body 106 in the array has its own dedicated oscillator 108 and/or power source 110. In some embodiments, oscillators 108 and power sources 110 are positioned to motivate more than one body 106 from the array. In some embodiments, the array of bodies 106 is arranged in a streamwise direction. In some embodiments, the array of bodies 106 is arranged in a spanwise direction. In some embodiments, the bodies 106 in the array are spaced substantially equidistantly. In some embodiments, the bodies 106 in the array are spaced irregularly. In some embodiments, the bodies 106 in the array all oscillate at the same amplitude and/or phase. In some embodiments, a first body adjacent to a second body in the array oscillates at a different amplitude and/or phase from the second body. In some embodiments, the bodies 106 in the array all oscillate at the same frequency. In some embodiments, a first body adjacent to a second body in the array oscillates at a different frequency. In some embodiments, the bodies 106 in the array are all the same size. In some embodiments, there are at least two sizes of body 106 in the array. In some embodiments, a first body adjacent to a second body in the array has a different configuration of outlets 118 compared to the second body.

Figure 4:
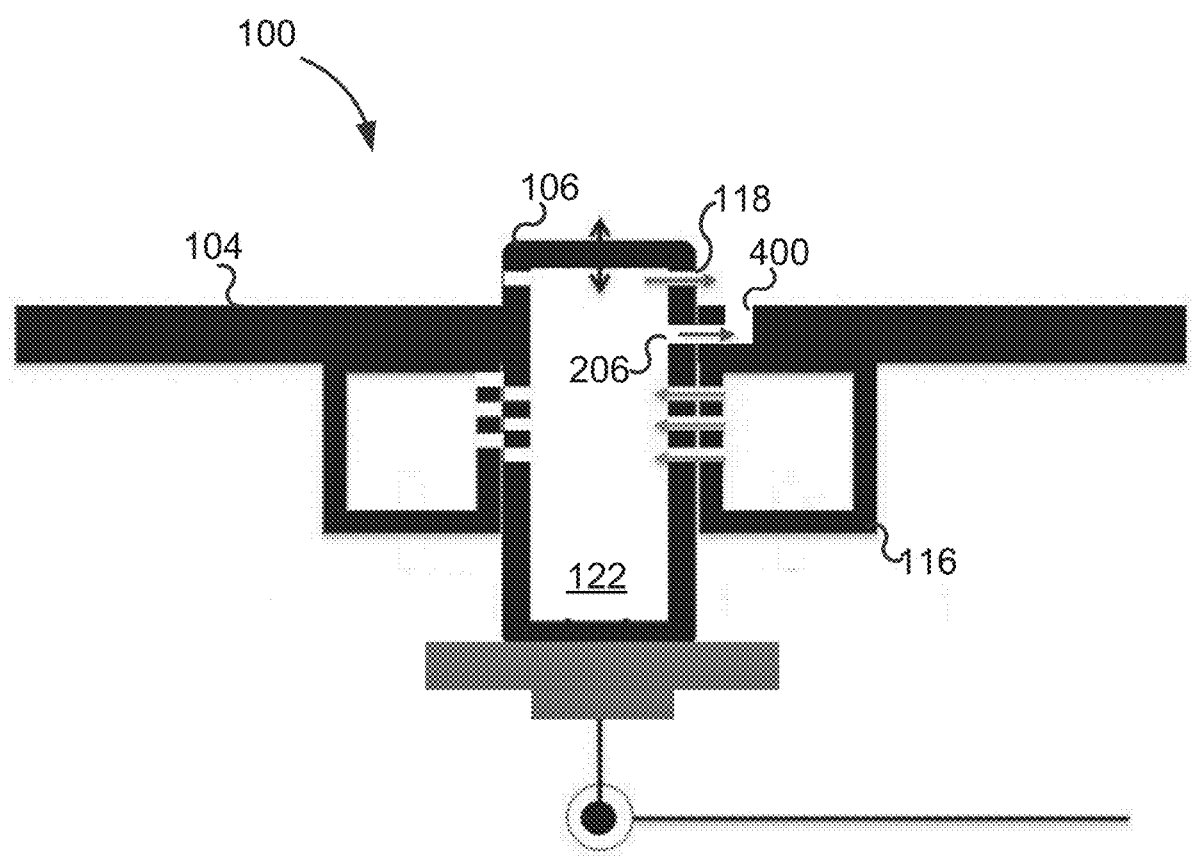
FIG. 4 is a schematic drawing of a further embodiment of a flow field controlling actuator assembly system according to some embodiments of the present disclosure.

Referring now to FIG. 4, in some embodiments, actuator assembly 100 is installed in a surface 104 having a surface opening 400 in close proximity to body 106. In some embodiments, surface opening 400 is adjacent body 106. Still referring to FIG. 4, in some embodiments, a wall opening 206 is also positioned to provide fluid communication between interior cavity 122 and surface opening 400. In some embodiments (not shown), a wall opening 206 is positioned to provide fluid communication between fluid jet source 116 and surface opening 400. In these embodiments, in addition to a fluid jet 114 emitted from outlets 118 located on body 106, fluid jets are also emitted at surface opening 400. In some embodiments, fluid jets 114 from outlet 118 and surface opening 400 are emitted substantially simultaneously. In some embodiments, fluid jets 114 from outlet 118 and surface opening 400 are emitted sequentially, wherein the opening is in fluid communication with the fluid jet source at least once per oscillation of the oscillating body.

In some embodiments, body 106 is static. In some embodiments, a valve (not shown) is disposed on or in body 106 and positioned to direct fluid jet 114. In some embodiments, the valve selectively directs fluid jet 114 to one of a plurality of outlets 118. The valve oscillates to direct fluid jet 114 in a plurality of directions. In some embodiments, fluid jet 114 is emitted continuously.

In some embodiments, actuator assembly 100 is configured to emit fluid jets 114 at the same instances during each oscillation. Such embodiments are most easily demonstrated using the source of compressed fluid 200 described above. As body 106 oscillates at its designed amplitude, compartments 202 will be in fluid communication with outlets 118 at the same times during each oscillation because the placement of the outlets, wall openings 206, and the distance between them is not changing. In some embodiments, actuator assembly 100 is configured to emit fluid jets 114 at varying instances during each oscillation. Such an embodiment is most easily demonstrated using the synthetic jet generator 300 described above. Synthetic jet generator 300 can be activated by an electrical signal, which can be delivered at any time that emission of a fluid jet 114 is desired. Thus, fluid jets 114 can be emitted at a first pattern during a first oscillation using a first pattern of synthetic jet generator 300 activation, but fluid jets can be emitted at a different pattern during the next oscillation by activating synthetic jet generator 300 in a different pattern.

Figure 5:
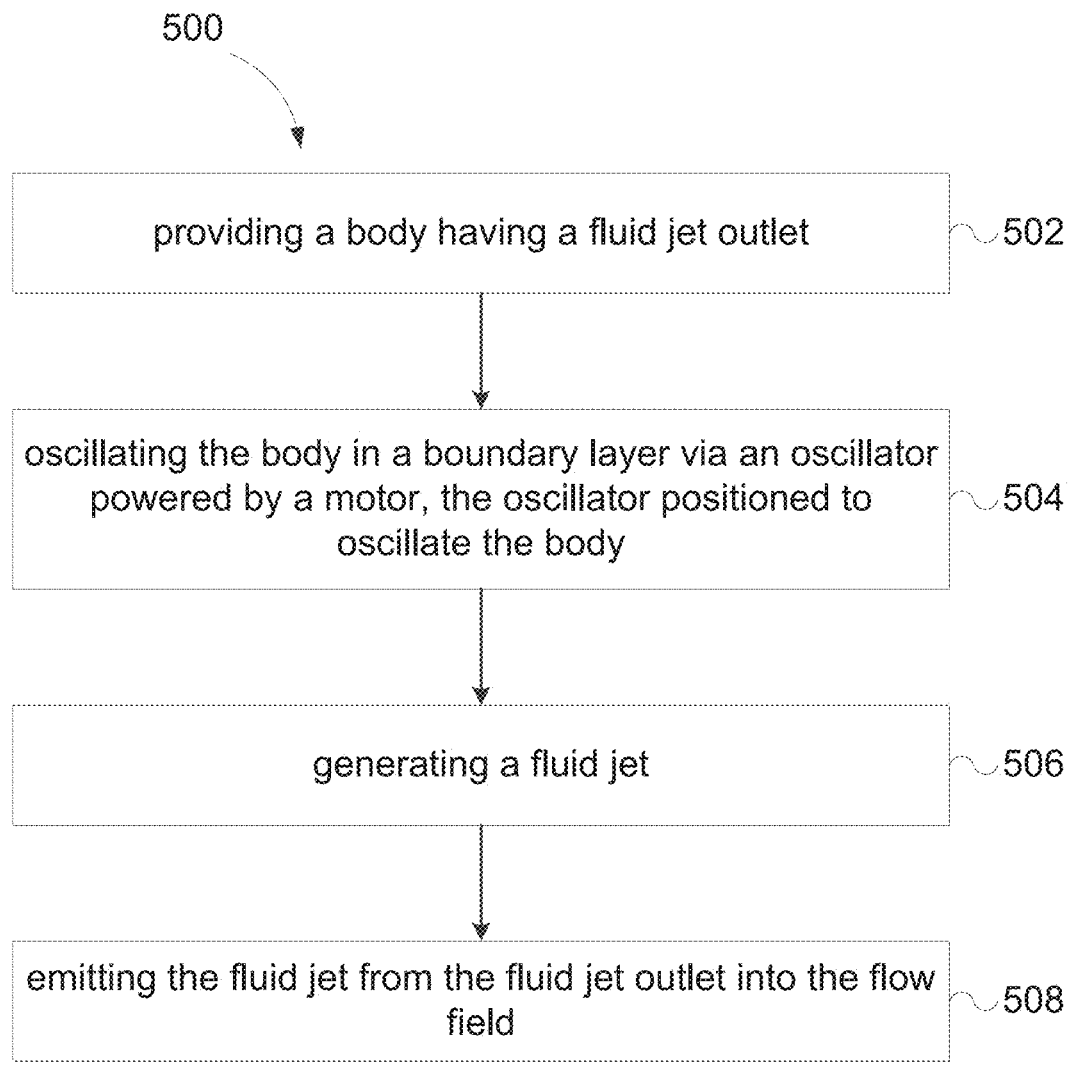
FIG. 5 is a flowchart of a method for controlling a flow field according to some embodiments of the present disclosure.

Referring now to FIG. 5, some embodiments of the disclosed subject matter include a method 500 of manipulating a flow field. At 502, a body is provided. As discussed above, in some embodiments, the body is provided with one or more fluid jet outlets. In some embodiments, providing a body 502 includes providing an array of bodies, such as a first body and an adjacent body. At 504, the body is oscillated in a flow field. Again, as discussed above, the body is oscillated via an oscillator powered by a power source, such as a motor or a piezoelectric driver, and positioned to oscillate the body. In some embodiments, oscillating the body 504 includes oscillating a first body at a first amplitude, frequency, and phase and oscillating a second body at a second amplitude, frequency, and phase. In some embodiments, the first and second bodies oscillate at the same amplitude, frequency, and phase. In some embodiments, at least one of the first amplitude, frequency, and phase is different from the corresponding second amplitude, frequency, and phase. In some embodiments, each of the first body's amplitude, frequency, and phase are different from the second body's amplitude, frequency, and phase.

At 506, a fluid jet is generated. At 508, the fluid jet is emitted from the one or more fluid jet outlets into the flow field. In some embodiments, the fluid jet is emitted into the boundary layer.

The advantage of the current invention is the combination of physical and virtual manipulation to flow fields with high efficiency (i.e., high gain with low input power) and specificity. This advantage is obtained through configuration of the bodies to not only oscillate through the flow field (physical modification) but also inject momentum altering fluid jets (virtual modification) and various locations, angles, and velocities in the flow field. Additionally, because the size of the bodies can be small, little disturbance is provided to the flow field, and an array of them can be distributed in strategic locations within or around a system to maximize their effectiveness, with applications including, but not limited to, air, ground, or sea vehicle performance enhancement, heat transfer control, noise mitigation, structural vibration reduction, etc.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of manipulating a flow field over a surface comprising:
    providing a body having a fluid jet outlet;
    oscillating said body in said flow field; and
    emitting a fluid jet from said fluid jet outlet into said flow field.

2. The method of manipulating a flow field according to claim 1, wherein said fluid jet is generated from a compressed fluid source, a synthetic jet generator, an external flow stream, or a combination thereof.

3. The method of manipulating a flow field according to claim 1, wherein providing a body having a fluid jet outlet further comprises:
    providing an array of bodies including a first body and at least one adjacent second body; and oscillating said first body at a first amplitude, frequency, and phase; and oscillating said adjacent second body at a second amplitude, frequency, and phase.

4. An actuator assembly for controlling a flow field over a surface comprising:
   a body extending at least partially through said surface, wherein the body is configured to oscillate at least one of vertically, horizontally, and rotationally relative to said surface at a predetermined frequency in said flow field;
   an oscillator, said oscillator positioned to oscillate a body; and
   wherein the body includes a fluid jet outlet, and said fluid jet outlet is shaped to emit a fluid jet to said flow field at a predetermined flow path and predetermined flow velocity.

5. The actuator assembly according to claim 4, a fluid jet source in fluid communication with said fluid jet outlet; wherein said fluid jet source is a compressed fluid, a synthetic jet generator, an external flow stream, or a combination thereof.

6. The actuator assembly according to claim 5, further comprising:
   a wall and an interior cavity defined in said body, said wall including a first opening; and
   a compartment for releasably retaining said compressed fluid, said compartment having a fluid jet source opening;
   wherein at first predetermined intervals during body oscillation, said compartment for releasably retaining said compressed fluid and said interior cavity are in fluid communication via said first opening in said wall and said fluid jet source opening and said compartment is in fluid communication with said fluid jet outlet.

7. The actuator assembly according to claim 6, further comprising a second interior cavity and a second wall opening, wherein said compartment and said second interior cavity are in fluid communication via said second wall opening, and said compartment is in fluid communication with said fluid jet outlet at second predetermined intervals during body oscillation.

8. The actuator assembly according to claim 5, further comprising an opening in said surface adjacent said body, wherein said opening is in fluid communication with said fluid jet source at least once per oscillation of said body.

9. The actuator assembly according to claim 4, wherein said body includes a wall and an end, wherein said fluid jet outlet is positioned on said wall or said end.

10. The actuator assembly according to claim 9, said body further comprising:
    a shape that is cylindrical, prismatic, or a combination thereof;
    an end having a conformation, said conformation being flat, convex, concave, angled, or a combination thereof.

11. The actuator assembly according to claim 9, wherein one of said wall and said end are dynamically modified by said fluid jet, said dynamic modification being inflation, deflation, expansion, contraction, translation, bulging, caving, or a combination thereof.

12. The actuator assembly according to claim 5, wherein said synthetic jet generator is a piezoelectric driver, movement of the oscillating body itself, an electromagnetic driver, a mechanically vibrated membrane, or a combination thereof.

13. The actuator assembly according to claim 4, wherein said fluid jet outlet is circular.

14. The actuator assembly according to claim 4, wherein said fluid jet outlet is positioned to direct said fluid jet at an oblique angle relative to at least one of said flow field and said surface.

15. The actuator assembly according to claim 9, wherein said fluid jet outlet is positioned at a particular height on said wall, wherein said particular height is at least less than about 95 percent of a total height of said wall as measured from said surface.

16. The actuator assembly according to claim 4, further comprising an array of bodies.

17. An actuator assembly for controlling a flow field over a surface comprising:
    a surface;
    an array of oscillating bodies positioned in said surface, said array of oscillating bodies configured to oscillate relative to said surface at a predetermined frequency, each of said oscillating bodies further comprising a wall and a fluid jet outlet positioned on said wall; and
    a fluid jet source in fluid communication with said fluid jet outlet,
    wherein said fluid jet outlet is positioned to direct a fluid jet at predetermined intervals during body oscillation at an angle between about 0 degrees to about 45 degrees relative to at least one of said flow field and said surface.

18. The actuator assembly according to claim 17, wherein said array of oscillating bodies is arranged in a streamwise direction.

19. The actuator assembly according to claim 17, said fluid jet source is a compressed fluid, a synthetic jet generator, an external flow stream, or a combination thereof.

20. An actuator assembly according to claim 19, wherein a first oscillating body in said array of oscillating bodies oscillates at a first amplitude, frequency, and phase; and an adjacent second oscillating body in said array of oscillating bodies oscillates at a second amplitude, frequency, and phase.

* * * * *